(No Model.) 2 Sheets—Sheet 1.

H. C. DRAVER.
SIFTER OR CHOP GRADER.

No. 560,575. Patented May 19, 1896.

Witnesses.
C. F. Kilgore
A. D. Merchant

Inventor.
Henry C. Draver.
By his Attorney.
Jas. F. Williamson

ANDREW B.GRAHAM. PHOTO-LITHO.WASHINGTON.D.C.

(No Model.) 2 Sheets—Sheet 2.

H. C. DRAVER.
SIFTER OR CHOP GRADER.

No. 560,575. Patented May 19, 1896.

Witnesses.
C. F. Kilgore
R. D. Merchant

Inventor:
Henry C. Draver.
By his Attorney
Jas. F. Williamson

UNITED STATES PATENT OFFICE.

HENRY C. DRAVER, OF ALLIANCE, NEBRASKA, ASSIGNOR TO EMIL R. DRAVER, OF SAME PLACE.

SIFTER OR CHOP-GRADER.

SPECIFICATION forming part of Letters Patent No. 560,575, dated May 19, 1896.

Application filed November 18, 1895. Serial No. 569,262. (No model.)

*To all whom it may concern:*

Be it known that I, HENRY C. DRAVER, a citizen of the United States, residing at Alliance, in the county of Boxbutte and State of Nebraska, have invented certain new and useful Improvements in Sifters or Chop-Graders; and I do hereby declare the following to be a full, clear, and exact description of the invention, such as will enable others skilled in the art to which it appertains to make and use the same.

My invention relates especially to that class of sifters or chop-graders wherein the stock is made to travel in various desired directions over a substantially plane surface by a proper arrangement of partitions or channel-walls and propelling-surfaces under a gyrating or other proper motion on the sieve-box.

My invention is directed to two features of improvement. One feature has for its object to provide an improved propelling-surface for moving the stock through the channels of the sieve under the gyrating or other motion thereon, and the other feature of improvement has for its object to provide a mounting for the sieve-box and its drive which will render the machine self-contained from a common portable frame.

To these ends my invention consists of the novel devices and combinations of devices which will be hereinafter described, and defined in the claims.

The invention is illustrated in the accompanying drawings, wherein, like notations referring to like parts throughout the several views—

Figure 1:
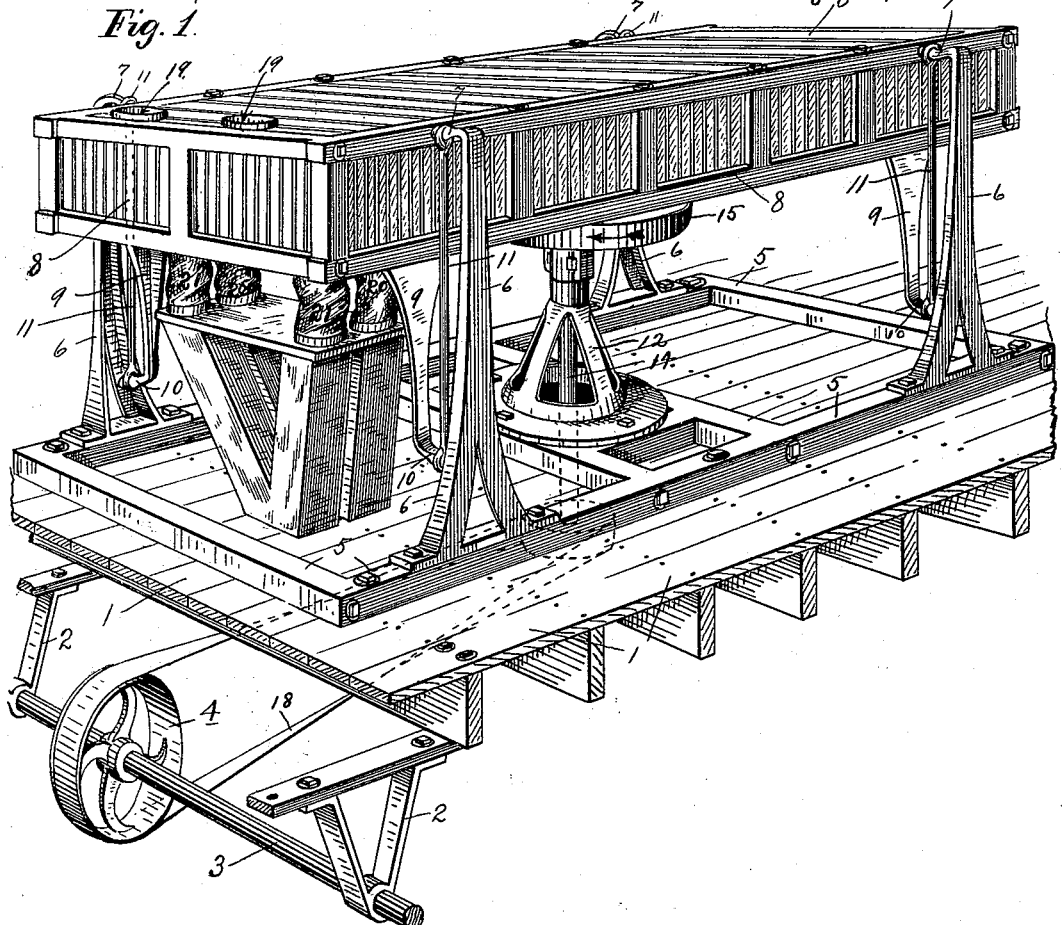
Figure 2:
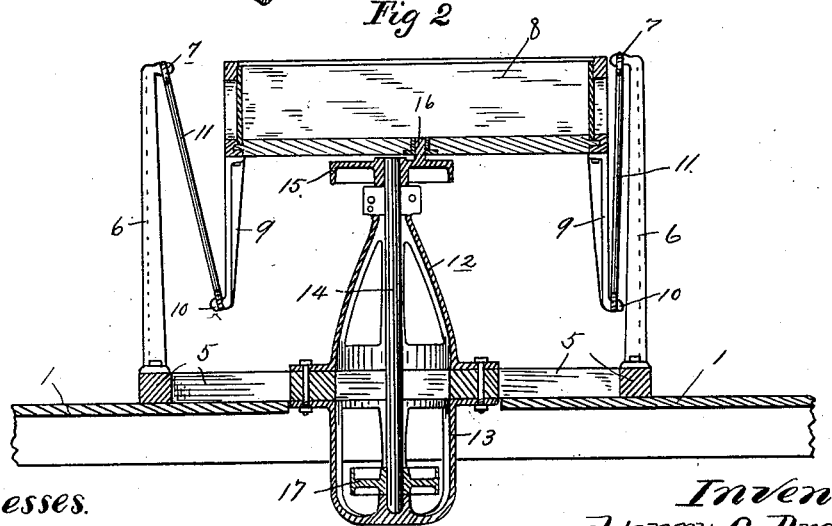
Figure 3:
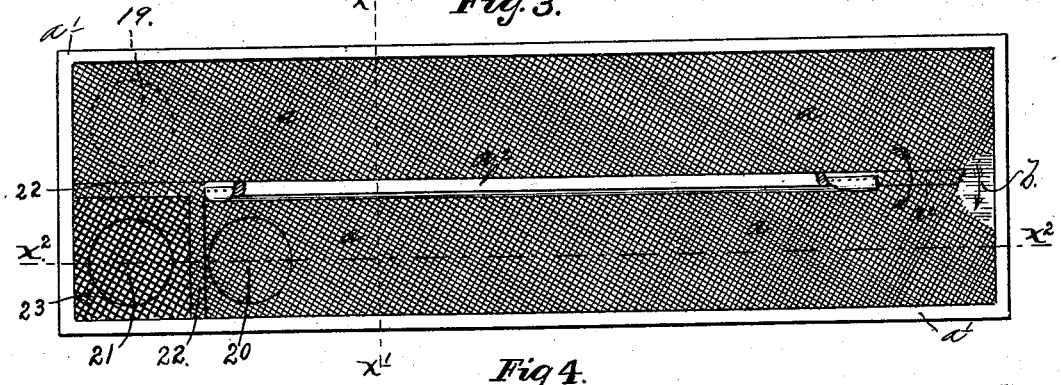
Figure 4:
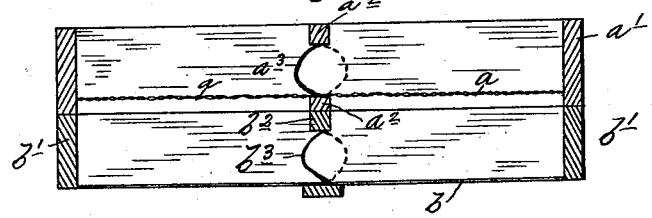
Figure 5:
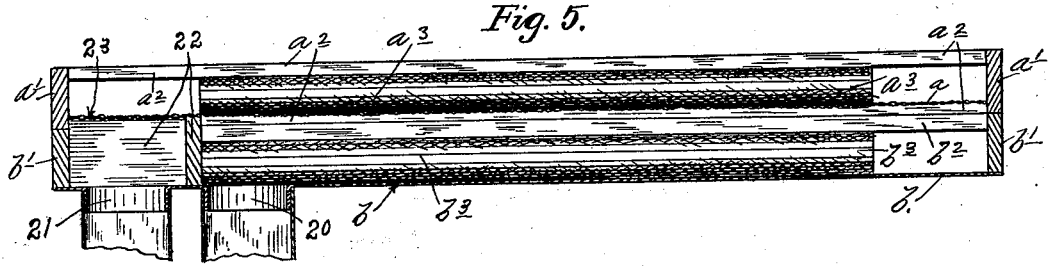
Figure 6:
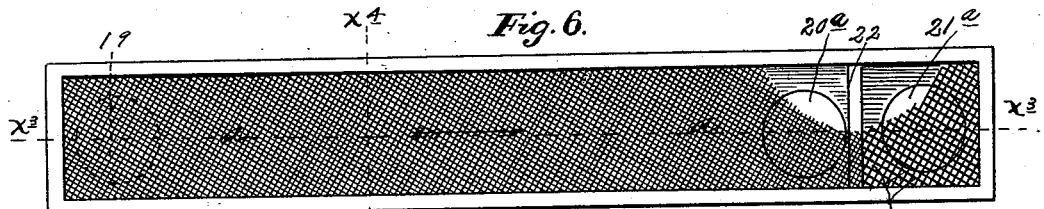
Figure 7:
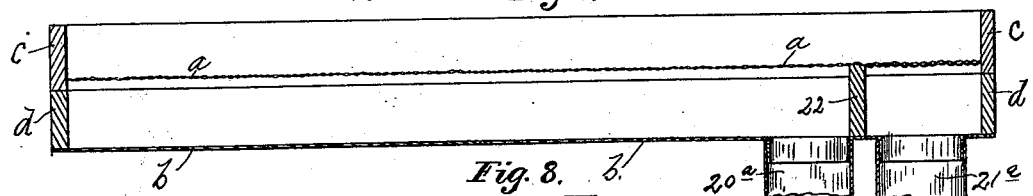
Figure 8:
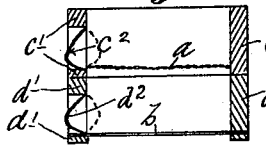

Figure 1 is a perspective view showing my improved machine as it would appear when in working position, some parts being broken away and others removed. Fig. 2 is a central cross-section looking from the left toward the right with respect to Fig. 1, the sieves being removed. Fig. 3 is a plan view of a divided or double sieve removed from the sieve-box, with some parts broken away. Fig. 4 is a cross-section on the line $x'x'$ of Fig. 3 looking from the left toward the right. Fig. 5 is a vertical longitudinal section on the line $x^2 x^2$ of Fig. 3 looking inward. Fig. 6 is a plan view of a single or undivided sieve removed from the sieve-box, with some parts broken away. Fig. 7 is a vertical longitudinal section on the line $x^3 x^3$ of Fig. 6, and Fig. 8 is a cross-section on the line $x^4 x^4$ of Fig. 6.

Considering first the general construction of the machine, as illustrated in Figs. 1 and 2, the numeral 1 represents the floor in a mill or other building. 2 represents hangers fixed to the floor-joist, 3 a line-shaft supported by said hangers, and 4 a pulley thereon.

The numeral 5 represents a skeleton-like frame-bed composed of suitable longitudinal and cross pieces securely bolted together and adapted to rest upon or be secured to the floor of the mill. From points near the opposite corners of the frame-bed 5 rise vertical standards or columns 6, which are rigidly secured to the bed and are provided with angular inturned bearing lugs or projections 7 at their upper ends.

8 represents the sieve-box, to the under surface of which, near its opposite corners, are fixed four depending arms or brackets 9, with outturned angular lugs or projections 10 at their lower ends. Four corresponding hanger-rods 11, with eyes at their opposite ends, engage over the lugs 7 of the standards or columns and the lugs 10 on the brackets or arms 9 of the sieve-box. This construction serves to suspend the sieve-box 8 in a horizontal position between the standards 6 of the frame, with freedom for a swinging or gyrating motion on the said frame.

12 and 13 represent, respectively, upper and lower bearing-brackets, which are adapted to be bolted to the bed 5 and to each other from opposite sides of the central cross-pieces of the bed, as best shown in Fig. 2. When thus secured together, the said brackets 12 and 13 afford upper and lower end bearings for a vertical shaft 14. The said shaft 14 is provided at its upper end with a crank-disk 15, the pin of which engages with a suitable seat 16, formed on the sieve-box 8. The lower end of the shaft 14 rests in a step-bearing of the bracket 13, and is provided with a pulley 17, adapted to be connected by belt 18 with the pulley 4 of the line-shaft 3. With these driving connections it is obvious that the sieve-box 8 will receive a gyrating motion under the action of the crank-disk on the vertical shaft 14.

With the general construction above described it must be obvious that the sieve-box and its drive are carried on a common portable frame, adapted to be located at any convenient point in the mill, and be supported entirely from the floor without any overhead connections. This is a great improvement over the constructions hitherto used for mounting and driving this class of machines. Such machines have hitherto usually been mounted with the sieve-box suspended from the ceiling or overhead timbers of the room and with the driving connections supported by the floor of the room. Hence great care was required to properly install the machine in working position, requiring an expert mechanic or millwright for the purpose, and even after the machine was properly installed the unequal settling of the upper and lower floors would frequently derange the parts, so as to throw the same out of proper working relation. With my construction, inasmuch as all the parts are carried by a common frame, they must necessarily sustain a constant relation, so far as the building is concerned. Moreover, this fact of all the parts being carried by a common portable frame permits the machine to be mounted at the shop and be shipped in suitable crating ready for immediate use on arrival at the mill without requiring the assistance of a millwright or expert mechanic to install the machine.

Having regard now to the other feature of my improvement, attention is directed to Figs. 3 to 8, inclusive, of the drawings. Figs. 3 to 5, inclusive, show my improved propelling-surface as applied to a double or divided sieve, while Figs. 6 to 8, inclusive, show the same as applied to a single or undivided sieve.

$a$ represents the bolting-cloth or other suitable sifting-surface, shown as supported by the sieve-frame $a'$.

$b$ represents the imperforate collecting-surface, which is shown as supported by the frame $b'$, of the same size as the sieve-frame $a'$ and located directly under the same. The sieve proper is divided into two parallel adjacent channels, above the cloth, by means of a central longitudinal partition composed of a rigid section or sections $a^2$, supported from the end walls of the frame $a'$, and a flexible section $a^3$, composed of canvas or other suitable material suitably supported by the rigid section $a^2$, so as to form a part of the said longitudinal dividing-partition. As shown, the rigid section $a^2$ of the said partition is composed of a pair of strips, spaced apart from each other to form a seat or working space for the flexible section $a^3$, which is supported between the two with its upper and lower edges made fast to the upper and lower strips, respectively. The flexible section $a^3$ stops short of the end walls of the frame $a'$, so as to leave passages around the same at each end, as best shown in Figs. 3 and 5. The flexible section $a^3$, if made of canvas or other non-elastic material, is slack in cross-section, so as to project laterally into the stock-channels, under the motion on the sieve, and form bellows-like pockets alternately in the opposite channels, which are operative to propel the stock through the said channels, but in opposite directions, on the opposite sides of the dividing-partition. The imperforate collecting-surface $b$ is similarly divided by a corresponding central partition composed of the rigid section $b^2$ and flexible section $b^3$, supported therefrom. The flexible section $b^3$ in the collector stops short of the frame at one end only, inasmuch as the stock has occasion to travel around one end only of said flexible section of the partition.

The feed or supply inlet position is shown by the dotted circle 19 in Fig. 3. The corresponding inlet-openings in the sieve-box 8, as shown in Fig. 1, are marked with the same number, 19. Two of said feed-openings appear in Fig. 1, because the sieve-box is constructed to hold two sieves, side by side, at the same level.

The numeral 20 represents the flour-outlet opening from the sieve and the corresponding flour-bags as they appear in Fig. 1.

21 represents the tailings-outlet opening from the collecting-surface and the tailings-bags themselves, as shown in Figs. 1 and 5.

22 represents the guard-block or partition-walls built up around the tailings-outlet for dividing the same off from the body of the imperforate surface $b$ up to the level of the bolting-cloth $a$. Directly over the tailings-outlet 21 the sifting-surface is provided with a screen section 23 of the proper size of mesh to pass everything delivered thereto from the cloth, with the exception of the locust-seeds, beans, grain, corn, or other material which is used for keeping clean the bolting-cloth.

Having regard to the action, if the crank-disk 15 be running in the direction shown by the arrow in Fig. 1 then the inlets and outlets for the divided sieve would occupy the positions shown in Figs. 1, 3, and 5, and under the gyrating motion on the sieve the stock would travel in the direction shown by the arrows in Fig. 3.

The general action of this class of machines is well understood by persons skilled in the art and does not require restatement here for the purposes of this case. The action peculiar to my improvement is that the flexible partition-section will alternately extend into the opposite channels under the motion on the sieve, and thereby form a bellows-like pocket alternately from the opposite channels. The bellows-like pocket thus formed permits the stock to crowd or wedge therein under the throw on the sieve in one direction and to be forced or impelled away from the pocket under the throw on the sieve in the opposite direction. Otherwise stated, the pocket is first formed to receive and permit the stock to wedge therein, and is then turned, as it were, inside out, so as to empty the pocket under the action or peculiar motion on the sieve. In these alternate movements of the flexible partition-section the stock in the opposite channels assists to form the pocket by forcing the flexible section outward in the direction of the throw on the sieve. Hence, as the flexible section alternately extends in opposite directions, it has the distinctive merit of always clearing itself. The material can never become clogged in the pocket.

The above statement describes the action on the double or divided sieve. The action on the single sieve (shown in Figs. 6, 7, and 8) is similar, so far as forming the pocket is concerned, on the outward throw of the sieve, but is somewhat different in the clearing action or movement of the pocket on the return or back stroke of the sieve. In the case of the single or undivided sieve one of the side walls of the sieve-frame $c$ is constructed with rigid sections $c'$ and flexible sections $c^2$. The collector-frame $d$ is provided with a similarly-constructed side wall, composed of the rigid sections $d'$ and the flexible section $d^2$. The feed-inlet 19 would be located in the same position as in the divided sieve, but the flour-outlet $20^a$ and the tailings-outlet $21^a$ will be located at the foot or delivery end of the single channel, formed by the side walls of sieve and collector, as shown in Figs. 6 and 7. Whether the pocket should be located on one or the other side wall in the case of the single sieve will of course depend on the direction of the crank-disk's travel and the relative location of the feed and delivery openings. In the case of the single or undivided sieve it may be found desirable to make the pocket of elastic material, with less slack than in the case of the double sieve, for the purpose of causing the elasticity of the material to assist in the inward or clearing movement of the pocket.

In practice it may be desirable in the case of the double or divided sieve to laterally brace the rigid sections $a^2$ of the dividing-partition.

It will of course be understood in respect to both features of invention hereinbefore described that minor changes might be made in the details of the construction without departing from the spirit of my invention. It should, perhaps, be noted that the action of the flexible pocket in the collector is precisely the same as in the case of the sieve. The only difference is that in the case of the divided or double sieve the cleaning material pursues an endless circuit around both ends of the partition, while in the case of the imperforate collecting-surface the material received thereon through the bolting-cloth travels from the head of the one channel around one end of the partition into the other channel and through the same to the flour-outlet. It should also be noted that while the frame for the bolting-cloth or sieve proper and the frame for the imperforate collecting-surface have been shown as separate they might equally well be formed together.

What I claim, and desire to secure by Letters Patent of the United States, is as follows:

1. A sieve, mounted to swing in substantially a horizontal plane and having a vertical slack flexible wall attached to the sieve-frame, by its upper and lower edges, adapted to form a bellows-like pocket operative, under the motion of the sieve, to propel the stock lengthwise of the channel, substantially as described.

2. A sieve mounted to swing in substantially a horizontal plane and divided into adjacent parallel channels, by flexible partition-walls or wall-sections, which, under the motion on the sieve, will alternately extend into the opposite channels and form bellows-like pockets, for propelling the stock in both channels, lengthwise thereof, but in opposite direction, substantially as described.

3. A sieve mounted to swing substantially in a horizontal plane and divided into adjacent parallel channels, by partitions composed of rigid and flexible longitudinal sections, with the flexible section slack in cross-section, whereby, under the motion on the sieve, the said flexible section will form bellows-like side pockets extending alternately into the opposite channels, for propelling the stock in both, substantially as described.

4. The combination with the frame having the bed 5 and the standards 6, of the sieve-box 8 having the depending brackets or arms 9, the hangers 11, depending from said standards and engaging said arms, for suspending the sieve-box, the upper and lower bearing-brackets 12 and 13, bolted to the frame-bed and to each other, the vertical shaft mounted in said bearing-brackets, the crank-disk 15 on the upper end of said shaft with pin engaging the sieve-box, and the driving-pulley 17 on the lower end of said shaft, all substantially as and for the purpose set forth.

In testimony whereof I affix my signature in presence of two witnesses.

HENRY C. DRAVER.

Witnesses:
E. R. DRAVER,
H. V. SCHAUPP.